United States Patent
Bosse

(10) Patent No.: US 8,246,899 B2
(45) Date of Patent: Aug. 21, 2012

(54) PROCESS FOR THE PREPARATION OF FILM SHEETS

(75) Inventor: Frank Bosse, Tecklenburg (DE)

(73) Assignee: Windmoeller & Hoelscher KG, Lengerich (DE)

(*) Notice: Subject to any disclaimer, the term of this patent is extended or adjusted under 35 U.S.C. 154(b) by 0 days.

(21) Appl. No.: 12/801,727

(22) Filed: Jun. 22, 2010

(65) Prior Publication Data

US 2011/0001276 A1  Jan. 6, 2011

Related U.S. Application Data

(63) Continuation of application No. 10/524,558, filed as application No. PCT/EP03/010345 on Sep. 12, 2003, now abandoned.

(30) Foreign Application Priority Data

Sep. 20, 2002 (DE) .................................. 102 43 958

(51) Int. Cl.
B29C 57/00 (2006.01)
(52) U.S. Cl. ........................................................ 264/563
(58) Field of Classification Search .................... 264/563
See application file for complete search history.

(56) References Cited

U.S. PATENT DOCUMENTS

| 3,061,875 A | 11/1962 | Gerow |
| 4,115,048 A | 9/1978 | Alderfer et al. |
| 4,270,891 A | 6/1981 | Hopper |
| 5,437,544 A | 8/1995 | Achelpohl |
| 6,705,980 B2 | 3/2004 | Hoene et al. |
| 2002/0012785 A1 | 1/2002 | Leduc |
| 2002/0048617 A1 | 4/2002 | Hoene et al. .................. 425/343 |

FOREIGN PATENT DOCUMENTS

| DE | 43 03 952 A1 | 6/1994 |
| DE | 19501668 C1 | 2/1996 |
| DE | 296 21 374 U1 | 3/1997 |
| DE | 100 40 055 A1 | 3/2002 |
| EP | 0 813 169 A2 | 12/1997 |

OTHER PUBLICATIONS

Dellbrugge, Herbert, Machine Translation of DE19501668C1, Feb. 2, 1996.

*Primary Examiner* — Larry Thrower
(74) *Attorney, Agent, or Firm* — Jacobson Holman PLLC

(57) ABSTRACT

A device and a process are employed to prepare sheets from a film tube. The process steps include extruding the film tube, laying the film tube flat and squeezing it, reversing the film tube, and cutting the extruded film tube. The film tube is cut before the squeezing step and at least one resulting sheet runs through only one reversing device before the sheet is fed to a stationary processing device or storage device.

7 Claims, 3 Drawing Sheets

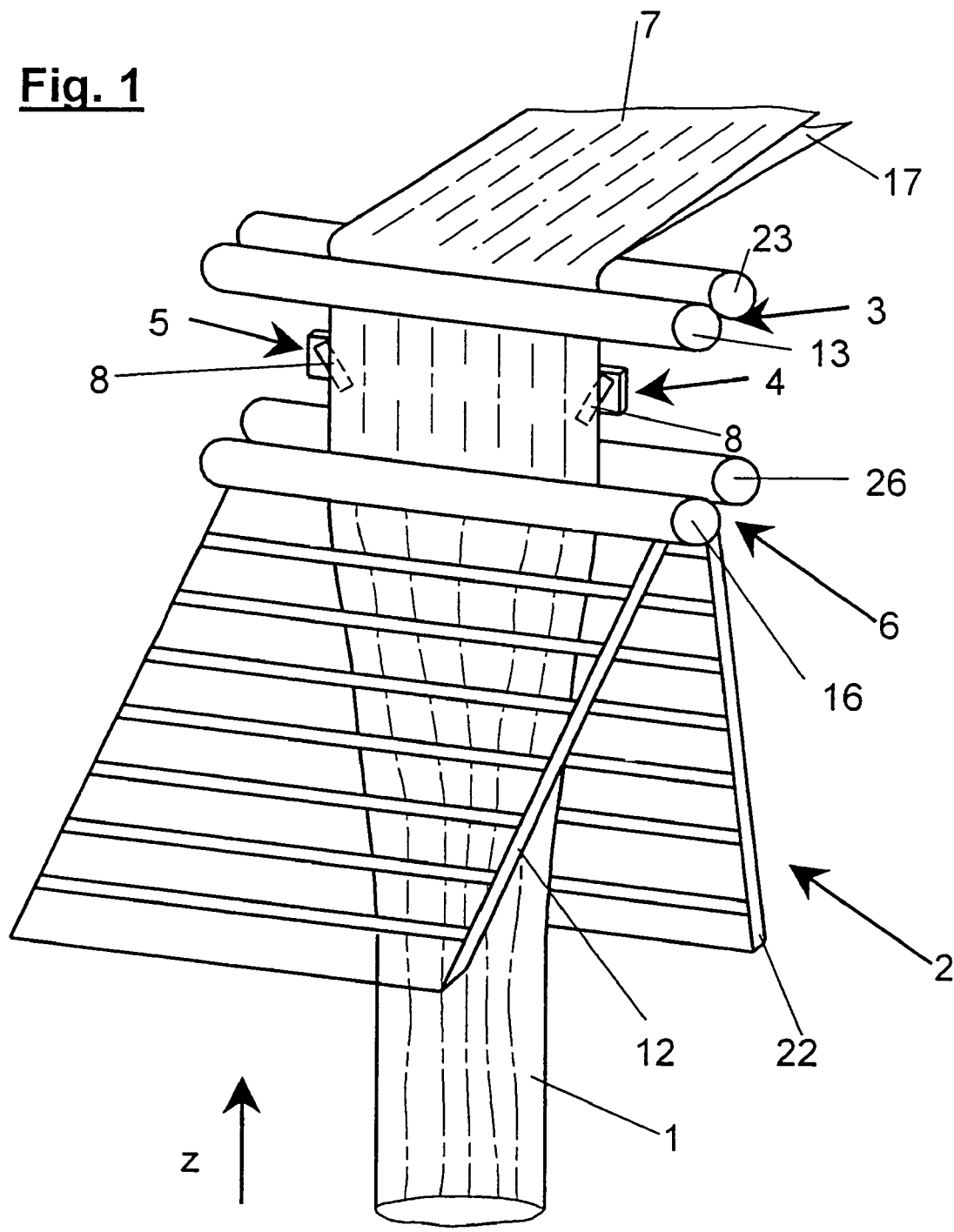

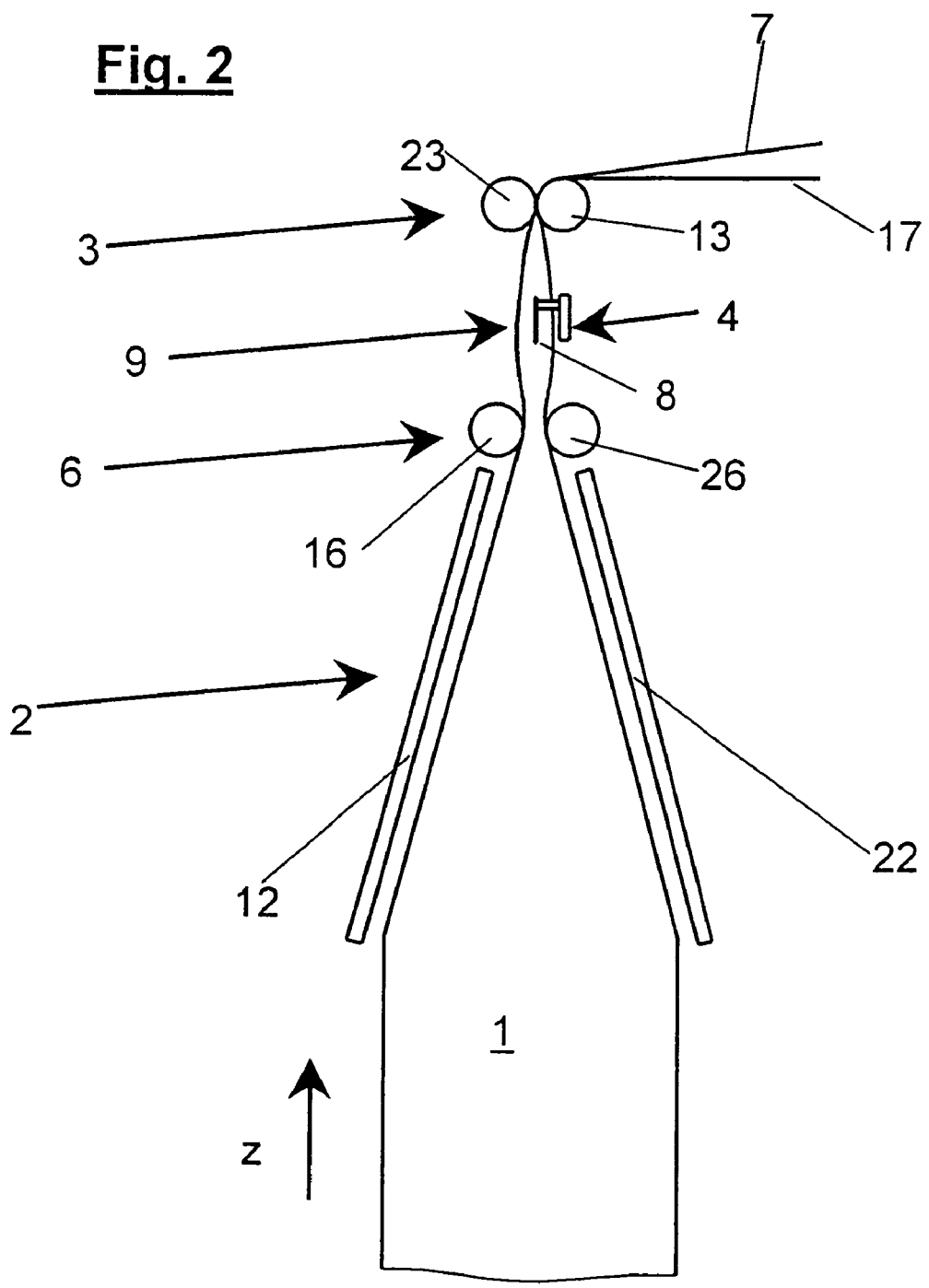

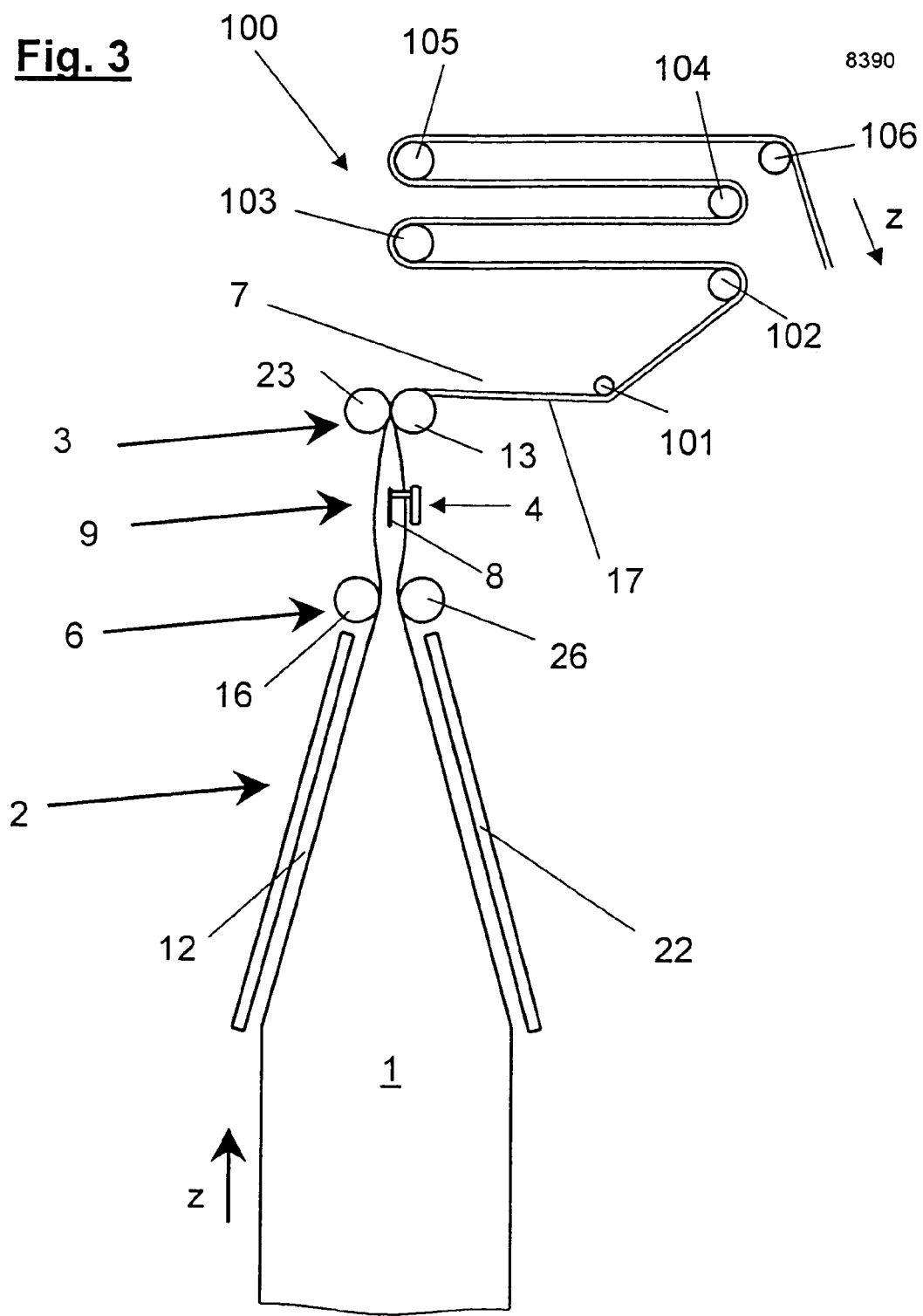

PROCESS FOR THE PREPARATION OF FILM SHEETS

CROSS-REFERENCE TO RELATED APPLICATION

This application is a continuation application of U.S. application Ser. No. 10/524,558, filed Feb. 14, 2005 now abandoned, the disclosure of which is incorporated by reference as if fully set forth herein. The predecessor application, U.S. application Ser. No. 10/524,558, is a nationalization of PCT/EP03/010345 filed Sep. 12, 2003, and published in German.

BACKGROUND OF THE INVENTION

1. Field of Invention

The invention concerns a process for the preparation of sheets, that contains the following characteristics of the process:
  extruding a film tube
  laying the film tube flat and squeezing it
  reversing the film tube
  cutting the extruded film tube

2. Description of the Prior Art

Processes of this kind are used usually in connection with tubular film extrusion plants. Often a film tube is extruded, laid flat, squeezed and subsequently fed to a winding equipment. It is particularly mentionable that the tubular film sheet usually runs through a so-called reversing device after the squeezing.

All afore-mentioned functional units are known in published form. Thus e.g. the DE 100 40 055 lays claim to such a reversing device and also shows the associated squeezing and lay-flat (flattening) devices.

In order to transform the film tube into film sheets one uses different types of cut-off devices that are attached to the winding equipment and transform the tubes into film sheets immediately before the beginning of the winding process. Usually for this purpose trimming sections are arranged at both the edges of the collapsed film tube. This process however results in a lot of wastage. Since modern standard procedures however allow for an exact adjustment of the diameter of the extruded tubular film and the breadth of the collapsed film tube, in many cases a trimming section is not used. Instead of that cleavers are attached to the winding equipments that slit open the collapsed tubular sheet directly at its edges and thus avoid unnecessary wastage.

This type of the production of sheets from film tubes is however not suited for thin sensitive or sticky films. These films are affected by the action of the cleaver on the collapsed film tube. Films of the aforementioned type are thus still prepared with the help of trimming sections that are put on the film after the film has run through the reversing device.

SUMMARY OF THE INVENTION

Therefore the task of the present invention is to suggest a process that makes trimming sections redundant and contains the costs of the device.

The task is solved by the fact
  that the film tube is cut in the conveying direction of the film tube (z) before the squeezing takes place and
  that at least one resulting sheet runs through only one reversing device before it is fed to a stationary processing device or storage device.

Through this measure the aforesaid cut-off device can cut the film tube while air is still present in the film bubble, so that no damage of the interior surface of the film tube occurs when the blade cuts through the film and interpositions in the internal space of the film tube.

Further preferential design forms of the process for the production of sheets have a reversing device that reverses the sheets that result from the cutting process, as they lie flat on each other.

In the production of bonding films it is particularly advantageous if the sticky film layer forms the outer circumference of the extruded film tube. In this way the sticking of both the sheets is avoided particularly during their common transport through the reversing device.

BRIEF DESCRIPTION OF THE DRAWINGS

Further design forms of the invention are based on the drawings and the graphic description.

The individual figures illustrate:
FIG. 1 A complete view of a device in which the film is cut before it reaches the squeezing device.
FIG. 2 A side view of this device
FIG. 3 A side view of a device in accordance with the invention.

DETAILED DESCRIPTION OF THE PREFERRED EMBODIMENTS

The FIGS. 1 and 2 illustrate a device that among other things has a flattening device 2, a cut-off device 4 and a squeezing device 3. Since the cut-off device 4 is illustrated in front of the squeezing device 3 the film can be cut before the due reversing process.

In the conveying direction z the development of the tube is described as follows:

The film tube 1 that is extruded from a tubular film extrusion unit (not illustrated in the figure) usually has a circular profile. A flattening device 2 is attached in the transfer direction z. This flattening device 2 compresses the profile successively from two opposite sides. Behind the flattening device 2 the film tube 1 is led through a presqueezing device 6. The associated pre-nip rollers 16 and 26 are distanced from one another such that the straight sides of the film tube 1 do not lie on each other yet. An air cushion remains in the film tube 1 through the squeezing process that is not yet complete. The figure also illustrates an attachment of two cut-off devices 4, 5. These cut-off devices 4, 5 each contain a blade 8. The blades 8 are attached to the machine frame in a manner that is not illustrated more elaborately in the figure. These blades 8 are arranged such that they slit open the film tube 1 at its end roundings. In the further course of the process the sheets 7, 17 resulting from the slitting run through the squeezing device 3 that consist of two nip rollers 13, 23. This device serves to press both the sheets 7, 17 flatly on each other and thus prevent the inclusion of air between both the sheets 7, 17. For the purpose of clarification the sheets 7, 17 are illustrated in FIG. 1 as diverging from each other. But when they are fed to the reversing device they lie flat on each other as illustrated in FIG. 3.

A suitable reversing device is described in detail in e.g. the published documents DE 100 40 055 A1. The common leading of both the films lying on each other into a reversing device is basically also possible in another reversing device.

The side view of the device in accordance with the invention illustrated in FIG. 2 clarifies the lay-flat process of the film tube in the flattening device 2 of which only the two sides of the flattening plates 12, 22 can be seen. It can be clearly seen that the connecting pre-nip rollers 16, 26 have a fixed distance between each other. This distance is selected among other things depending on the operating parameters such that one more air cushion exists is inside the film tube at the height (level) of the cut-off device 4. Due to the air cushion the parts of the film tube 1 that form the sheets 7, 17 after the slitting have a somewhat larger distance between each other than while running through the squeezing device. The nip rollers 13, 23 prevent air from escaping through the squeezing device 3. In this manner the film tube can also be slitted laterally without the risk of damaging very thin or sticky sheets 7, 17 from contacting the blades 8.

The devices illustrated in the figures disclose a particularly advantageous method to cut the film tube 1 before reaching the squeezing device 3. However it is also possible to cut the film tube before the squeezing device 3 without providing a presqueezing device 6.

FIG. 3 illustrates once again the device illustrated in FIG. 2 whereby a reversing device 100 is depicted. After the sheets 7, 17 have run through the squeezing device 3 they run together past the lead rollers 101, the first deflecting roller 102, the first air turning bar 103, the second deflecting roller 104 and the second air turning bar 105. Finally the sheets 7, 17 reach the outfeed roller 106, which is a stationary roller that does not participate in the reversing process. Subsequently the sheets 7, 17 are fed to further processing devices or storage devices (not illustrated in the figure). The distance between the sheets 7, 17 from the squeezing device is illustrated as rather large in order to clarify that they are two sheets. During the winding process of the sheets, they can be wound up individually or together.

At this juncture it should be mentioned once again that FIG. 3 illustrates only the basic layout of a very advanced reversing device whereby the attachment of the sketched film lead elements 101 to 105 and also the actual reversing process that happens through reversing movements of the rollers and bars 103 to 105 around a vertical axis, is not illustrated. The process in accordance with the invention however encompasses all reversing processes.

Moreover it must be emphasized once again that reversing devices with differing numbers on deflecting rollers 102, 104 and air turning bars 103, 105 are also known. In this connection reference is made once again to published documents such as the DE 100 40 055, DE 43 03 952 or EP 0 873 845.

Particularly advantageous are reversing devices whereby one turning bar and one deflecting roller form a functional pair. In such functional pairs one deflecting roller and one turning bar carry out a reversing movement that takes place in relation to an axis that runs orthogonal to the rotational position of the deflecting roller around its axis of main symmetry. By all rules this axis is vertical and aligned with it in the main conveying direction of the film. Reversing devices with one, two or even three functional pairs are known. The word functional pair and its meaning for the described reversing devices are explained in the application DE 100 40 055.

| | List of reference symbols |
|---|---|
| 1 | Film tube |
| 2 | Flattening (lay-flat) device |
| 3 | Squeezing device |
| 4 | Cut-off device |
| 5 | Cut-off device |
| 6 | Presqueeze device |
| 7 | Sheet |
| 8 | blade |
| 9 | Static air cushion |

| | List of reference symbols |
|---|---|
| 10 | Arrow in the conveying direction of the film tube |
| 11 | |
| 12 | Side bar |
| 13 | nip roller |
| 14 | |
| 15 | |
| 16 | Pre-nip roller |
| 17 | Sheet |
| 18 | |
| 19 | |
| 20 | |
| 21 | |
| 22 | |
| 23 | nip roller |
| 24 | |
| 25 | |
| 26 | Pre-nip roller |
| 100-106 | Film leading elements |
| z | Conveying direction of the film tube |

What is claimed is:

1. A process for the preparation of sheets in the following sequence of steps, comprising:
   extruding a film tube having a sticky external surface;
   laying the extruded film tube flat;
   conveying the laid flat film tube between a pair of opposed rollers separated from one another so as to provide a separation distance between opposed flattened sides of the film tube;
   cutting the flattened film tube in a conveying direction (z) thereof to provide a first and a second sheet separated from one another;
   squeezing the first and second sheets; and
   performing a reversing operation such that parts of surfaces of at least one of the sheets come into direct contact, the surfaces that come into direct contact with each other being only those that formed an internal surface of the film tube.

2. The process according to claim 1, wherein the sheets are prepared so as to have at least one sticky surface by extruding the film tube with at least one sticky peripheral surface.

3. The process according to claim 1, wherein the step of laying the extruded film tube flat includes compressing the extruded film tube from opposite sides thereof so as to provide flattened film tube sides that are not in contact with each other.

4. The process according to claim 3, wherein a cushion of air remains between the flattened film tube sides.

5. The process according to claim 4, wherein the step of cutting the flattened film tube is effected with the cushion of air being present between the flattened film tube sides.

6. A process for the preparation of sheets in the following sequence of steps, comprising:
   extruding a film tube having a sticky external surface;
   laying the extruded film tube flat, including compressing the extruded film tube from opposite sides thereof so as to provide flattened film tube sides that are separated from each other;
   conveying the flattened film tube sides between a first pair of opposed rollers separated from one another by a fixed distance so as to provide a separation distance between opposed, conveyed, flattened sides of the film tube;
   cutting the flattened, separated film tube in a conveying direction (z) thereof to provide a first and a second sheet that are separated from each other;

conveying the cut, flattened, separated film tube between a second pair of opposed rollers so as to bring into contact with each other the first and second sheets; and performing a reversing operation such that parts of surfaces of at least one of the sheets come into direct contact, the surfaces that come into direct contact with each other being only those that formed an internal surface of the film tube.

7. The process according to claim 6, wherein the step of laying the extruded film tube flat and the step of cutting the flattened film tube are effected with a cushion of air being present between the film tube sides.

* * * * *